(12) United States Patent
Bourgerie

(10) Patent No.: US 6,460,231 B2
(45) Date of Patent: Oct. 8, 2002

(54) QUICK RELEASE CLAMP FOR ELONGATED OBJECTS

(76) Inventor: Donald E. Bourgerie, 1579 Mistletoe La., Redding, CA (US) 96002-0422

( * ) Notice: Subject to any disclaimer, the term of this patent is extended or adjusted under 35 U.S.C. 154(b) by 0 days.

(21) Appl. No.: 09/752,598

(22) Filed: Dec. 27, 2000

(65) Prior Publication Data

US 2002/0007538 A1 Jan. 24, 2002

Related U.S. Application Data

(60) Provisional application No. 60/173,303, filed on Dec. 28, 1999.

(51) Int. Cl.$^7$ .................................................. A47F 7/00
(52) U.S. Cl. .......................... 24/487; 24/518; 24/521; 24/564
(58) Field of Search .......................... 24/517, 518, 505, 24/506, 519, 520, 543, 489, 487, 521, 507, 564; 248/74.1, 113, 316.5, 312, 313; 211/65, 66, 70.2, 70.6, 70.8

(56) References Cited

U.S. PATENT DOCUMENTS

| | | | | |
|---|---|---|---|---|
| 1,835,632 A | * | 12/1931 | Buhrke | 206/819 |
| 2,171,053 A | * | 8/1939 | White et al. | 224/317 |
| 3,711,633 A | * | 1/1973 | Ghirardi et al. | 174/135 |
| 4,063,646 A | * | 12/1977 | Stahl, Jr. | 211/4 |
| 4,172,578 A | * | 10/1979 | Pate | 248/74.3 |
| 4,340,052 A | * | 7/1982 | Dennehey et al. | 604/317 |
| 5,184,764 A | * | 2/1993 | Saito | |
| 5,226,892 A | * | 7/1993 | Boswell | 128/DIG. 26 |
| 5,323,517 A | * | 6/1994 | Su | 24/20 EE |
| 5,390,876 A | * | 2/1995 | Hatano et al. | 248/68.1 |
| 5,560,138 A | * | 10/1996 | Dentsbier | 211/70.8 |
| 5,647,563 A | * | 7/1997 | Gantner et al. | |
| 5,815,894 A | * | 10/1998 | Soriano | 24/297 |
| D448,280 S | * | 9/2001 | Bourgerie | D8/382 |

* cited by examiner

Primary Examiner—James R. Brittain
(74) Attorney, Agent, or Firm—John J. Leavitt

(57) ABSTRACT

Presented is a quick-engaging and quick-release device for securely supporting elongated objects in either a horizontal or vertical attitude on a vertical support structure or surface or overhead on an appropriate support surface. A base member has end and side walls. Two oppose side walls are correspondingly notched. A resiliently deformable block of cushioning material may be removably inserted into the hollow shell so that it is flush with the top edges of the end and side walls. A hollow cap member is pivotally attached to the base member and may be pivoted away from the base member into open position to receive an elongated object. When the hollow cap member is pivoted into closed condition, the elongated object is retained by and between the base member and the cap member. A latch assembly is provided for selectively releasably locking the cap and base members in closed condition about the elongated object.

8 Claims, 3 Drawing Sheets

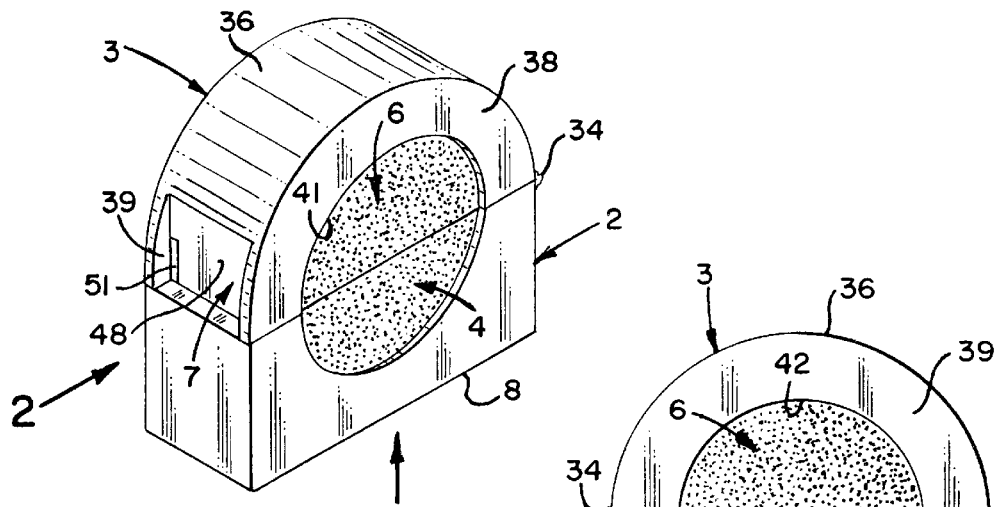
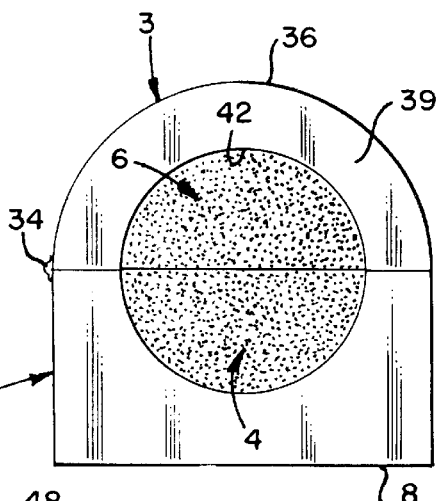
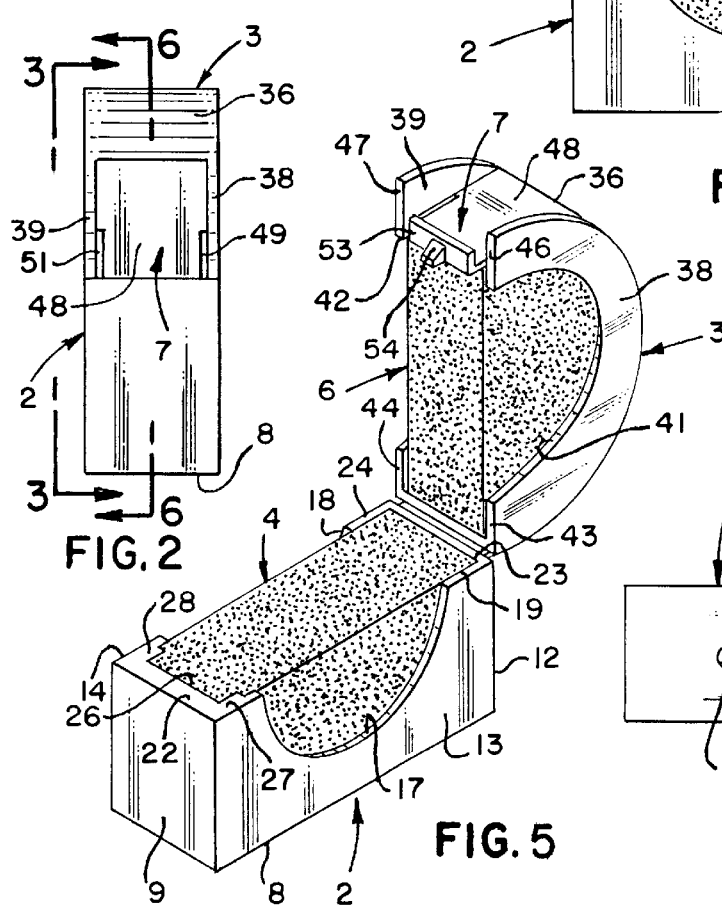
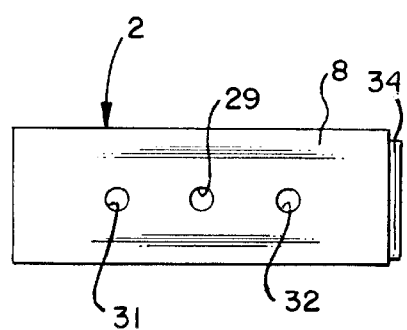
FIG. 1
FIG. 3
FIG. 2
FIG. 5
FIG. 4

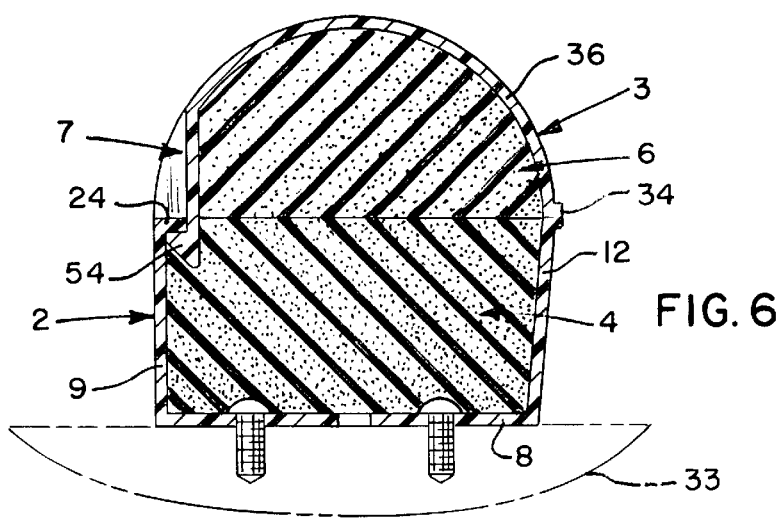
FIG. 6
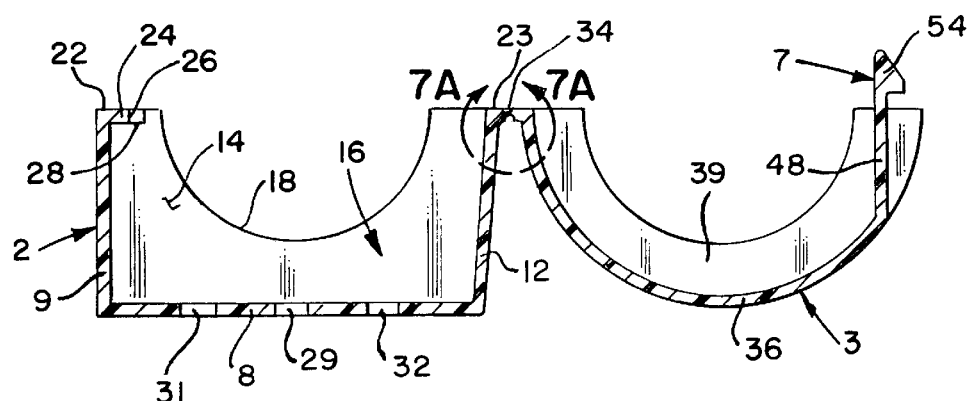
FIG. 7
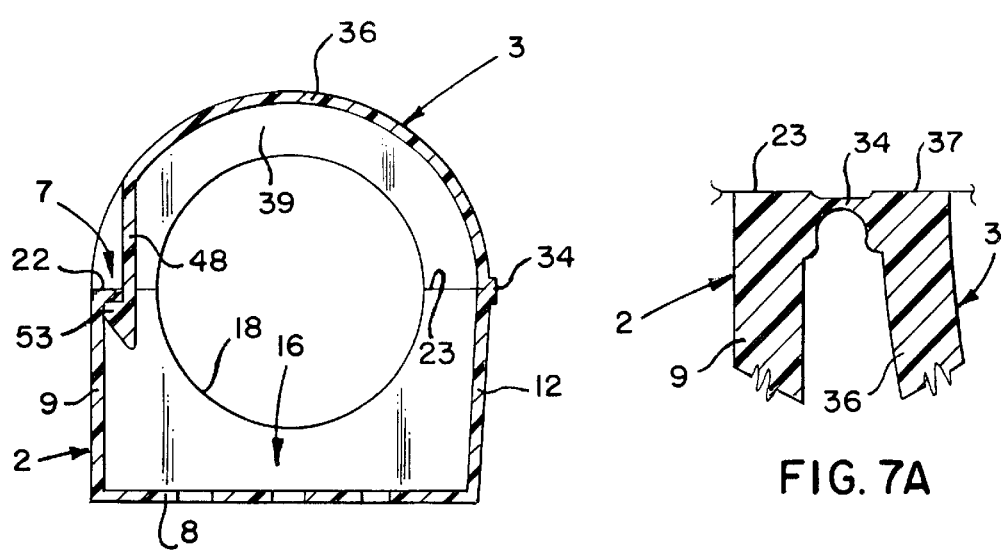
FIG. 8
FIG. 7A

QUICK RELEASE CLAMP FOR ELONGATED OBJECTS

RELATED APPLICATION

Provisional application Ser. No. 60/173,303 filed Dec. 28, 1999 forms the basis for a claim to priority for the invention disclosed and claimed herein.

BACKGROUND OF THE INVENTION

1. Field of the Invention

This invention relates to a clamp structure for retaining elongated objects supported on a supporting structure, and particularly to a quickly engageable and releasable clamp that may selectively incorporate cushioning means and which may be rotatably or non-rotatably secured to a vertical or horizontal support structure such as a vertical wall or an overhead ceiling or elevated horizontal shelf for supporting elongated objects in either a horizontal or vertical attitude.

2. Description of the Prior Art

A preliminary patentability and novelty search in connection with the invention disclosed and illustrated herein has revealed the existence of the following United States and foreign patents:

| United States | | |
| --- | --- | --- |
| D-289,009 | D-323-106 | D-328,023 |
| 3,954,238 | 4,291,855 | 4,478,381 |
| 4,624,432 | 4,653,716 | 4,728,071 |
|  | 4,802,646 |  |
| | Foreign | |
| 1,338,602 (GB) | 1,345,011 (GB) | 2,066,887 (GB) |

From the prior art patents cited above, it will be understood and appreciated that the problem of supporting elongated objects of many different types has plagued society for many years. It will also be appreciated from the patents listed above that many different types of clamps, clips, etc. have been designed to grip, lock or otherwise secure elongated objects to a supporting structure. While the concept of supporting an elongated object by detachable attachment to a supporting surface or structure is an old concept, the specific structure disclosed herein, including it simplicity, economy of manufacture, its ability to provide a cushioned support for an elongated object and its potential for selectively modifying its orientation to support elongated objects horizontally or vertically without detaching the device from the vertical supporting surface or overhead surface has not been found in the prior art noted above.

Accordingly, one of the principal objects of the invention is the provision of a unitary "clam" shell like structure incorporating a cushioning element adapted to resiliently embrace the supported elongated object.

Another object of the invention is the provision of a unitary "clam" shell like structure incorporating a quick engagement and quick release latch means manipulable to releasably close the "clam" shell like structure circumferentially about the elongated object sought to be retained thereby.

A still further object of the invention is the provision of a quick engaging and quick release clamp formed as a unitary structure including a base member for attachment to a supporting structure and clamp member integral with the base member and pivotally secured thereto by means of a "live" hinge whereby the clamp member may be pivoted away from the base to expose the interior thereof for receiving the object to be supported and then closed to releasably trap the object between the base member and clamp member.

Yet another object of the invention is the provision of a unitary quick engaging and quick release structure for securing an elongated object in a horizontal attitude on a vertical support surface or horizontal overhead surface, or in a vertical attitude on a vertical support surface while simultaneously enveloping the elongated object between a pair of resiliently deformable cushioning elements detachably retained in the unitary structure.

The invention possesses other objects and features of advantage, some of which, with the foregoing, will become apparent from the following description and the drawings. It is to be understood however that the invention is not limited to the embodiment illustrated and described since it may be embodied in various forms within the scope of the appended claims.

SUMMARY OF THE INVENTION

In terms of broad inclusion, the quick engaging and quick release structure of the invention for securely supporting elongated objects in either a horizontal or vertical attitude on a vertical support structure or overhead on an appropriate support surface includes a base member that constitutes a hollow shell having end and side walls that extend integrally from a bottom wall. The two opposed side walls of the base are correspondingly recessed by semi-circular notches, and a resiliently deformable block of foam-like cushioning material is removably inserted into the hollow shell so that the top surface of the deformable block is substantially flush with the top edges of the end and side walls. A hollow cap or clamp member, is integrally pivotally attached to one end wall of the hollow shell and may selectively be pivoted away from the base into open position wherein the deformable block is exposed to receive an elongated object thereon, and when the hollow cap or clamp is pivoted into closed condition, the elongated object is releasably received by and between the base member and the cap member. A resiliently deformable block of foam-like material may be removably inserted into the hollow cap or clamp structure so that when the cap is closed, the two resiliently deformable blocks of foam material are in confronting relationship and resiliently embrace and cushion the elongated object lying therebetween. Releasable latch means are provided for selectively releasably locking the cap and base member in closed condition about the elongated object.

BRIEF DESCRIPTION OF THE DRAWINGS

FIG. 1 is a perspective view of the quick engaging and quick release clamp device shown equipped with resiliently deformable cushioning blocks and in closed and latched condition apart from a supporting structure and prior to the placement of an elongated object to be supported between the resiliently deformable cushioning blocks.

FIG. 2 is a left end elevational view of the device taken in the direction of the arrow 2 in FIG. 1.

FIG. 3 is a rear elevational view of the device taken in the direction of the arrows 3—3 in FIG. 2.

FIG. 4 is a bottom plan view of the device taken in the direction of the arrow 4 in FIG. 1.

FIG. 5 is a perspective view of the device shown in unlatched and open condition and embodying normally opposed selectively removable blocks of resiliently deformable cushioning material.

FIG. 6 is a vertical cross-sectional view of the device shown in latched and closed condition and equipped with the opposed blocks of resiliently deformable cushioning material, the view being taken in the direction of the arrows 6—6 in FIG. 2.

FIG. 7 is is a vertical cross-sectional view of the base and cap structure of the device shown in unlatched and fully open condition with the selectively removable bodies of resiliently deformable cushioning material removed to illustrate details of the construction of the base and cap structures.

FIG. 7(A) is an enlarged fragmentary vertical cross-sectional view of the "live" or integral hinge structure encompassed by the arrows 7(A)—7(A) in FIG. 7 that integrally and pivotally connects the cap or clamp member to the base member.

FIG. 8 is a vertical cross-sectional view of the device shown in latched and closed condition with the selectively removable resiliently deformable cushioning blocks removed.

DESCRIPTION OF PREFERRED EMBODIMENTS

Figure 9:
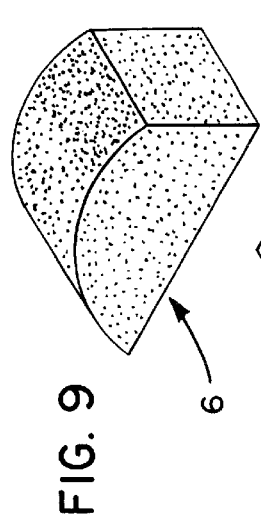
FIG. 9 is a perspective view of the selectively removable resiliently deformable cushioning block shown apart from the cap or clamp member of the device in which it is normally mounted.

There are numerous objects whose lengths and/or configurations create problems when they must be stored. Such objects, such as shovels, garden rakes, hoes and other elongated garden or household tools may be stood on end against a supporting surface, such as a wall, but the risk is always present that they will fall over and that someone will trip over them and fall. Or such tools may be placed horizontally on the ground or on a concrete surface but again there is a risk that someone will trip over them and fall, and even if this does not happen, stacking a multiplicity of various length tools in a pile makes it difficult to choose the one tool that you need at any given time. Accordingly, there has always been a need for a method or structure by which elongated objects such as garden tools and other tools used in other endeavors, including the boating industry, the motor home industry and for the home owner, could be supported individually or in groups either horizontally or vertically on a vertical supporting surface such as a wall, or overhead on a ceiling so as to make the elongated objects immediately visible when needed and readily accessible for use. Examples of such elongated objects includes shovels, rakes, hoes, axes, fishing poles, boat antennas the extreme end of which must be anchored to the boat, power cords, deck brushes, curtain rods and a variety of other elongated objects that may be supported on a quick engaging, quick release device as disclosed herein. The device disclosed and illutrated herein satisfies this need.

Referring to the drawings, it will be seen that the quick engage and quick release clamp device of the invention comprises a base member designated generally by the numeral 2, a cap or clamp member designated generally by the numeral 3 integrally and pivotally mounted on the base member 2, a resiliently deformable cushioning block designated generally by the numeral 4 removably mounted in the base member, a resiliently deformable cushioning block designated generally by the numeral 6 removably mounted on the cap or clamp member 3, and latch means designated generally by the numeral 7 cooperatively interposed between the base member and the cap or clamp member to selectively releasably latch the two members in a closed condition or release the releasable interconnection to enable full opening of the device to enable placement thereon or removal therefrom of an elongated object supported thereby.

With reference to FIGS. 5 and 7, it is noted that the structure thus described is preferably fabricated by injection molding of a suitable synthetic resinous material to provide a unitary structure that requires little or no finishing when removed from the mold in which it is formed. One of the suitable synthetic resins found satisfactory is Polypropylene. Other suitable synthetic resins, or even non-resinous materials such as metal, may be used, with variations in the manufacturing and assembly procedure required by the different materials.

As seen in FIGS. 5 and 7, the base member 2 comprises a hollow shell having a bottom wall 8, left and right end walls 9 and 12, respectively, and side walls 13 and 14, all integral with one another and all rising from and integral with the peripheral edges of the generally rectangular bottom wall 8 to form a recess or hollow space 16 defined by the integral bottom, end and side walls that rise therefrom. The side walls 13 and 14 are provided with semi-circular axially aligned recesses or notches 17 and 18, resepectively, the axis of the recesses being coincident with the plane of the top edges 19 and 21 of the side walls 13 and 14, respectively, the top edge 22 of the left end wall 9 and the top edge 23 of the right end wall 12.

Referring to FIGS. 5, 6, 7 and 8, it is noted that the top edge 22 of the left end wall 9 is widened in a portion 24 that extends inwardly beyond the thickness of the associated end wall so as to form an overhang that functions as part of the latch means 7 as will hereinafter be explained. It should also be noted that the inner edge 26 of the overhang, at opposite ends thereof, abuts a pair of lugs 27 and 28 that define the width of the opening into the interior recess 16 of the hollow shell that forms the base member. To complete the detailed description of the base member 2, there is provided in the bottom 8, medianly along the longitudinal axis thereof and spaced between the side walls, a central aperture 29, a left aperture 31 and a right aperture 32, these apertures being equally spaced on opposite sides of the central aperture 29. Any one or all of the apertures may be utilized to accept appropriate screws, such as machine screws, or wood screws, or dry-wall screws to mount the base member on a support structure 33 as indicated in FIG. 6. Where expedient or necessary, a single mounting screw (not shown) may be mounted through the center aperture 29 so as to enable convenient rotation of the base member from a vertical orientation, in which the device is used to support horizontally oriented elongated objects, to a horizontal orientation wherein the device will support vertically oriented elongated objects. This facility for reorientation may of course be accomplished merely by loosening the center-mounted screw only slightly without removing it and then tightening it when the device is repositioned.

The cap or clamp member 3 is preferably injection molded simultaneously with the base member and from the same material, such as Polypropylene. As seen in various views of the drawings, the cap or clamp member 3 is pivotally hinged integrally adjacent the top edge 23 of the right end wall 12 of the base member 2. The hinge 34 is frequently referred to as a "live" hinge because it is integral with both associated members (2 and 3) between which it is integrally connected and is configured to provide flexibility of the synthetic resinous web constituting the hinge which integrally and pivotally interconnects the members 2 and 3.

As seen in the drawings, the cap or clamp member 3 is substantially semi-circular in overall configuration, having a semi-circular wall 36 terminating at one end in end edge 37 (FIG. 7(A) which is inetgrally hinged to the end edge 23 of the base member. Over its entire semi-circular extent, semi-circular wall 36 is provided with radially inwardly projecting flanges 38 and 39 the inner edges of which define recesses or notches 41 and 42, respectively, the configuration and proportions of which correspond to the recesses or notches 17 and 18 formed in the side walls of the base member so that when the cap or clamp member 3 is pivoted into a closed condition as illustrated in FIGS. 1, 2, 3, 6 and 8, the end edges 43 and 44, respectively, next adjacent the hinge 36, abut and lie in the same plane as the associated top edge portions 19 and 21 of the base member.

In like manner, when the cap member is closed and latched, the opposite end edges 46 and 47 of the flanges 38 and 39, respectively, abut and lie in the same plane as the top edge portions 27 and 28 of the base member 2, thus completing the axially aligned circular recesses formed by the side walls of the device as clearly depicted in FIGS. 1, 3 and 8. When the base member 2 and the cap or clamp member 3 are thus oriented, the two pivotally connected members are automatically latched by the act of bringing the two members into this closed orientation so as to eliminate the possibility of inadvertent opening of the device.

The latch means 7 includes the inwardly projecting integral portion 24 at the top edge 22 of the left end wall 9 as best seen in FIGS. 6, 7 and 8. For purposes of definition of structure and function, it may be said that this inwardly projecting and immovable portion of the latch means is the "jamb" to which the pivotally movable cap or clamp member 3 is selectively detachably secured by the latch means. The movable portion of the latch means 7 comprises a radially inwardly offset resiliently flexible latch plate 48 that constitutes an integral end portion of the semi-circular wall 36 at one end thereof adjacent the end edges 46 and 47 of the flanges 38 and 39, respectively, to form in effect an inherently resilient cantilever beam.

As seen in FIGS. 1, 2 and 5, the radially inwardly offset resiliently flexible latch plate 48 is integral at one end with the semi-circular wall 36 but is separated from the associated end portions of flanges 38 and 39 by slots 49 and 51 so as to permit the resiliently flexible latch plate to resiliently flex inwardly in relation to the associated flanges 38 and 39 and inwardly away from the fixed latch member 24 when a radially inward directed pressure is applied to the latch plate 48. When the inwardly directed pressure on the latch plate 48 is released, it springs back to its normally unstressed latched position.

To releasably engage the latch plate 48 to the inwardly extending immovable "jamb" member or flange 24 when the cap 3 is pivoted into closed position as seen in FIGS. 1, 2, 3, 6 and 8, there is formed integrally on the free end 52 of the latch a right angle flange 53 that extends the full width of the latch plate and which, when the cap 3 is closed, passes between the guide lugs 27 and 28 and hooks under the top edge extension 24 at the left end of the device. This releasably latched position is shown in FIGS. 6 and 8. This latching action is automatically effected when the cap 3 is pivotally depressed by digital manipulation into closed condition by the action of an inwardly sloping cam surface formed on the lug 54 integrally formed on the outer surface 56 of the right angle flange 53. When the cam surface impinges on the free edge of the extension 24, continued downward pressure on the cap causes the cam to press the latch plate inwardly until the right angle flange on which the cam lug 54 is integrally formed slips below the lower edge of the inwardly projecting right angle flange. When this occurs, the inherent resilience of the latch plate 48 causes the latch plate to spring outwardly, engaging the right angle flange under the projecting "jamb" member 24, thus releasably latching the cap member 3 to the base member 2.

Figure 10:
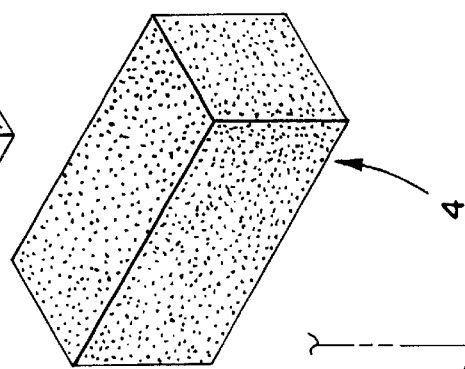
FIG. 10 is a perspective view of the selectively removable resiliently deformable cushioning block shown apart from the base member of the device in which it is normally mounted.

Resiliently deformable cushioning blocks 4 and 6 are illustrated in FIGS. 9 and 10 apart from the base member 2 and the cap or clamp member 3. As illustrated in FIG. 5, the resiliently deformable cushioning block 4 is releasbly inserted into the recess or hollow space.16 formed in the base member between the end and side walls thereof so that the top surface of the block 4 lies flush with the top edges of the side and end walls. Because of the presence of the semi-circular recesses in the side walls, it will be appreciated that when an elongated object is placed on the foam-like resiliently deformable cushioning block, pressure applied to the elongated object in the direction of the supporting cushioning block will cause the elongated object to be pressed into the block, thus deforming the block to accept the configuration of the elongated object.

Figure 11:
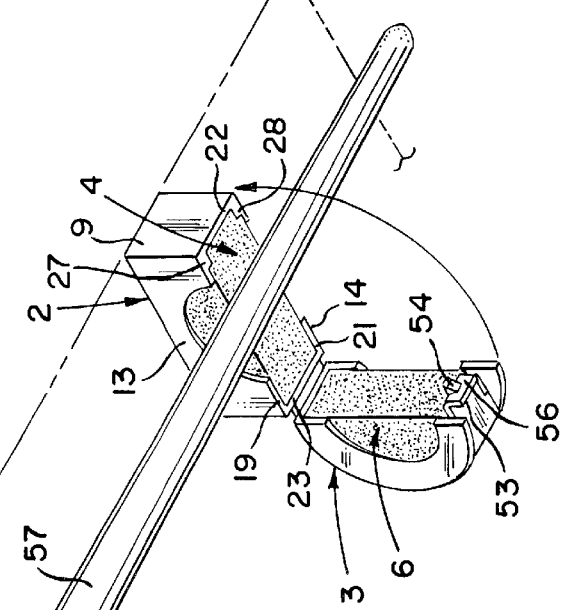
FIG. 11 is a perspective view illustrating a pair of the quick release and quick engaging devices, one shown in open condition, mounted spaced apart on the undersurface of a support structure and illustrating the manner in which an elongated object is quickly and easily supported thereon.
Figure 11:
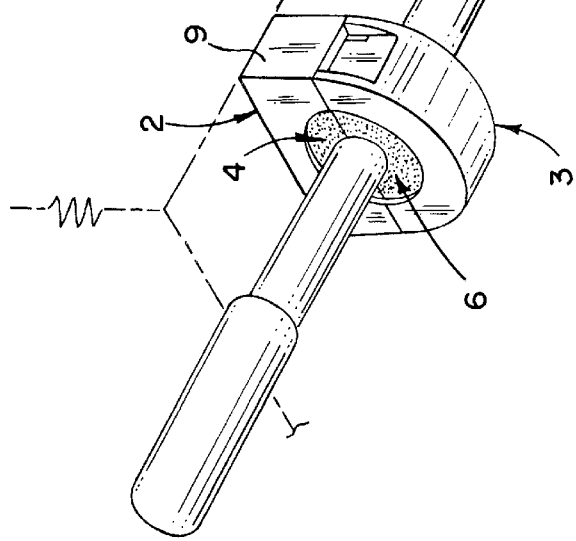

Such pressure in this device is exerted upon the elongated object by the resiliently deformable cushioning block 6 releasably retained in the channel formed between the semi-circular wall 36 and the integral semi-circular flanges 38 and 39 when the cap or clamp member is pivoted into closed condition as illustrated in FIG. 1 and shown more graphically in FIG. 11 where the elongated object 57 is shown confined in the closed device on the left end portion of the object and about to be confined by the opposing blocks 4 and 6 in the device associated with the right end portion of the elongated object.

Having thus described the invention, what is believed to be new and novel and sought to be protected by Letters Patent of the United States is as follows.

I claim:

1. A quick-engage/quick-release clamp device for supporting elongated objects, comprising:

a) a base member having a bottom wall, confronting spaced side walls and confronting spaced end walls defining a generally quadrilateral hollow shell having an access opening thereinto opposite said bottom wall providing access into the interior of said shell and axially aligned notches in said confronting spaced side walls;

b) a cap member constituting a hollow shell having confronting spaced side walls extending integrally from a transverse wall member, said cap member being pivotally mounted on said base member and digitally pivotable to selectively cover or uncover said access opening in said base member, said confronting spaced side walls having axially aligned notches therein coextensive with said axially aligned notches in said base member side walls when said cap member covers said access opening therein;

c) latch means on said base member and said cap member cooperable to automatically releasably engage said cap member to said base member when said cap member is digitally pivoted to cover said access opening in said base member and selectively digitally actuable to disengage said cap member from said base member whereby said cap member may be pivoted to uncover said access opening in the base member to facilitate placement of an elongated object on the base member;

d) wherein said transverse wall member of said cap member is semi-circular and said spaced side walls integral with said transverse wall member are radially extending and semi-circular having inner peripheries defining said axially aligned notches therein and end edges terminating in a plane coincident with the central axis of said axially aligned notches; and e) wherein a resiliently deformable block of cushioning material is removably disposed in said cap member between said spaced side walls and conforming to the interior periphery of said transverse semi-circular wall member and including a flat surface coincident with the plane of said end edges of said semi-circular spaced side walls whereby said resiliently deformable block of cushioning material spans said axially aligned notches defined by said semi-circular spaced side walls.

2. The quick-engage/quick release clamp device according to claim 1, wherein a resiliently deformable block of cushioning material fills said hollow shell and provides a resiliently deformable cushioning surface coincident with said access opening and extending across said axially aligned notches thereof, whereby when said cap member engages said base member the resiliently deformable blocks of cushioning material in said base member and said cap member abut contiguously in a common plane whereby an elongated object supported therebetween resiliently deforms said deformable blocks of cushioning material to embrace the circumference of said elongated object to retain it clamped therebetween.

3. The quick-engage/quick-release clamp device according to claim 1, wherein said base member and said cap member are formed from synthetic resinous material.

4. The quick-engage/quick-release clamp device according to claim 1, wherein a flexible hinge is integrally interposed between said base member and said cap member enabling pivotal displacement of said cap member in relation to said base member of at least 90 degrees.

5. The quick-engage/quick-release clamp device according to claim 4, wherein said flexible hinge is integrally interposed between said transverse wall member of said cap member and an associated end wall of said base member.

6. The quick-engage/quick-release clamp device according to claim 1, wherein said latch means includes an inwardly extending integral flange on one end wall of said base member and an integral resiliently flexible latch plate on said cap member having a latch lug thereon releasably engageable with said inwardly extending integral flange on the base member end wall when said cap member is pivoted to cover said access opening in said base member.

7. The quick-engage/quick release clamp device according to claim 1, wherein a resiliently deformable block of cushioning material is removably disposed within said generally quadrilateral hollow shell constituting said base member.

8. The quick-engage/quick-release clamp device according to claim 7, wherein said resiliently deformable block of cushioning material within said hollow shell fills said hollow shell and provides a resiliently deformable cushioning surface coincident with said access opening and extending across said axially aligned notches thereof.

* * * * *